US008850021B2

(12) United States Patent
Cao et al.

(10) Patent No.: US 8,850,021 B2
(45) Date of Patent: Sep. 30, 2014

(54) DEVICE DISCOVERY IN A UBIQUITOUS COMPUTING ENVIRONMENT

(75) Inventors: Junwei Cao, Beijing (CN); Zhen Wang, Beijing (CN)

(73) Assignee: Empire Technology Development LLC, Wilmington, DE (US)

( * ) Notice: Subject to any disclaimer, the term of this patent is extended or adjusted under 35 U.S.C. 154(b) by 339 days.

(21) Appl. No.: 13/265,778

(22) PCT Filed: Dec. 17, 2010

(86) PCT No.: PCT/CN2010/079911
§ 371 (c)(1),
(2), (4) Date: Oct. 21, 2011

(87) PCT Pub. No.: WO2012/079240
PCT Pub. Date: Jun. 21, 2012

(65) Prior Publication Data
US 2012/0179691 A1 Jul. 12, 2012

(51) Int. Cl.
*G06F 17/30* (2006.01)
*H04L 12/24* (2006.01)

(52) U.S. Cl.
CPC ............ *H04L 41/0856* (2013.01); *H04L 41/12* (2013.01)
USPC ........... 709/226; 713/155; 713/159; 380/277; 380/286; 719/312

(58) Field of Classification Search
USPC .................. 709/226, 230, 237; 713/155, 159; 380/277, 286; 719/312
See application file for complete search history.

(56) References Cited

U.S. PATENT DOCUMENTS

2008/0294639 A1* 11/2008 Davis et al. ........................ 707/9
2012/0096163 A1* 4/2012 Tai et al. ........................ 709/226

FOREIGN PATENT DOCUMENTS

| CN | 101399778 A | 4/2009 |
| CN | 101543017 | 9/2009 |
| JP | 2009-134341 A | 6/2009 |
| WO | 2009140821 A1 | 11/2009 |

OTHER PUBLICATIONS

International Search Report and Written Opinion of International Application No. PCT/CN2010/079911 mailed Sep. 8, 2011.
"Universal Description Discovery and Integration," Wikipedia, accessed at http://web.archive.org/web/20100307052300/http://en.wikipedia.org/wiki/Universal_Description_Discovery_and_Integration, last modified on Jan. 28, 2010, pp. 1-4.
Gellersen et al.: "Supporting device discovery and spontaneous interaction with spatial references," Personal and Ubiquitous Computing, vol. 13, Issue 4, pp. 255-264 (2009).

(Continued)

*Primary Examiner* — Lisa Lewis
*Assistant Examiner* — Sharif E Ullah
(74) *Attorney, Agent, or Firm* — Brundidge & Stanger, P.C.

(57) ABSTRACT

Technologies are generally described for methods, instructions, and client applications for device discovery in a ubiquitous computing environment. In some examples, the methods, instructions, and client applications may facilitate the organization of features of devices in a ubiquitous computing environment into a series of hierarchical hash numbers, the ordering of the hierarchical hash numbers corresponding to the respective devices, and the searching for a particular one of the devices by attempting to match hashed search criteria to the ordered hierarchical hash numbers at one of the devices in the ubiquitous computing environment.

21 Claims, 5 Drawing Sheets

(56) References Cited

OTHER PUBLICATIONS

Sharmin et al.: "SAFE-RD (Secure, Adaptive, Fault Tolerant, and Efficient Resource Discovery) in Pervasive Computing Environments," International Conference on Information Technology: Coding and Computing, vol. 2, pp. 271-276 (2005).

Stoica et al.: "Chord: A Scalable Peer-to-peer Lookup Service for Internet Applications," In Proceedings of the ACM SIGCOMM Conference, vol. 31, Issue 4, pp. 149-160 (2001).

Saito et al.: "A Cross-search of Geophysical Fluids Data Archive Server Performed by P2P in Consideration of Interactive Refining Operations," The Institute of Electronics, Information and Communication Engineers, Proceedings of 19th Data Engineering Workshop, Japan, Technical Committee on the Institute of Electronics, Information and Communication Engineers, Apr. 7, 2008.

* cited by examiner

250

| | SHN | DHN 102(a) | DHN 102(b) | DHN 102(d) | DHN 102(e) | DHN 102(n) |
|---|---|---|---|---|---|---|
| 215 | 5 | 6 | 5 | 5 | 5 | 4 |
| 220(a) | 0 | 6 | 3 | 5 | 3 | 3 |
| 220(b) | 4 | 4 | 4 | 3 | 2 | 4 |
| 220(c) | 7 | 3 | 3 | 6 | 2 | 1 |
| 220(d) | 7 | 0 | 0 | 1 | 0 | 0 |

FIG. 3

DEVICE DISCOVERY IN A UBIQUITOUS COMPUTING ENVIRONMENT

CROSS-REFERENCE TO RELATED APPLICATION

The present application is the U.S. national phase application of, and claims priority to, International application No. PCT/CN2010/079911, filed on Dec. 17, 2010, the entirety of which is incorporated herein by reference.

TECHNICAL FIELD

The implementations and embodiments described herein pertain generally to search in a ubiquitous computing environment.

BACKGROUND ART

A ubiquitous computing environment, particularly a peer-to-peer computing environment, employs a decentralized architecture by which tasks and resources are partitioned among network nodes. The network nodes, or peers, are both suppliers and consumers of resources, including data and storage. Further, in such an environment, resources are typically exchanged directly over the underlying Internet Protocol (alternatively referred to as "IP").

Distributed hash tables (alternatively referred to as "DHTs") are a class of decentralized distributed systems that provide a lookup service for resources in the peer-to-peer computing environment. DHT-based networks utilized for data discovery and management include the Chord project, PAST storage utility, the P-Grid, and the CoopNet content distribution system.

SUMMARY OF INVENTION

A client application implements methods and programs to facilitate the organization of features of devices in a decentralized computing environment into a series of hierarchical hash numbers, the ordering of the hierarchical hash numbers corresponding to the respective devices, and the searching for a particular one of the devices by attempting to match hashed search criteria to the ordered hierarchical hash numbers at one of the devices in the decentralized computing environment.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

FIG. 3 shows an example of a figure table utilized in various embodiments of device discovery in a ubiquitous computing environment;

DESCRIPTION OF EMBODIMENTS

Figure 1:
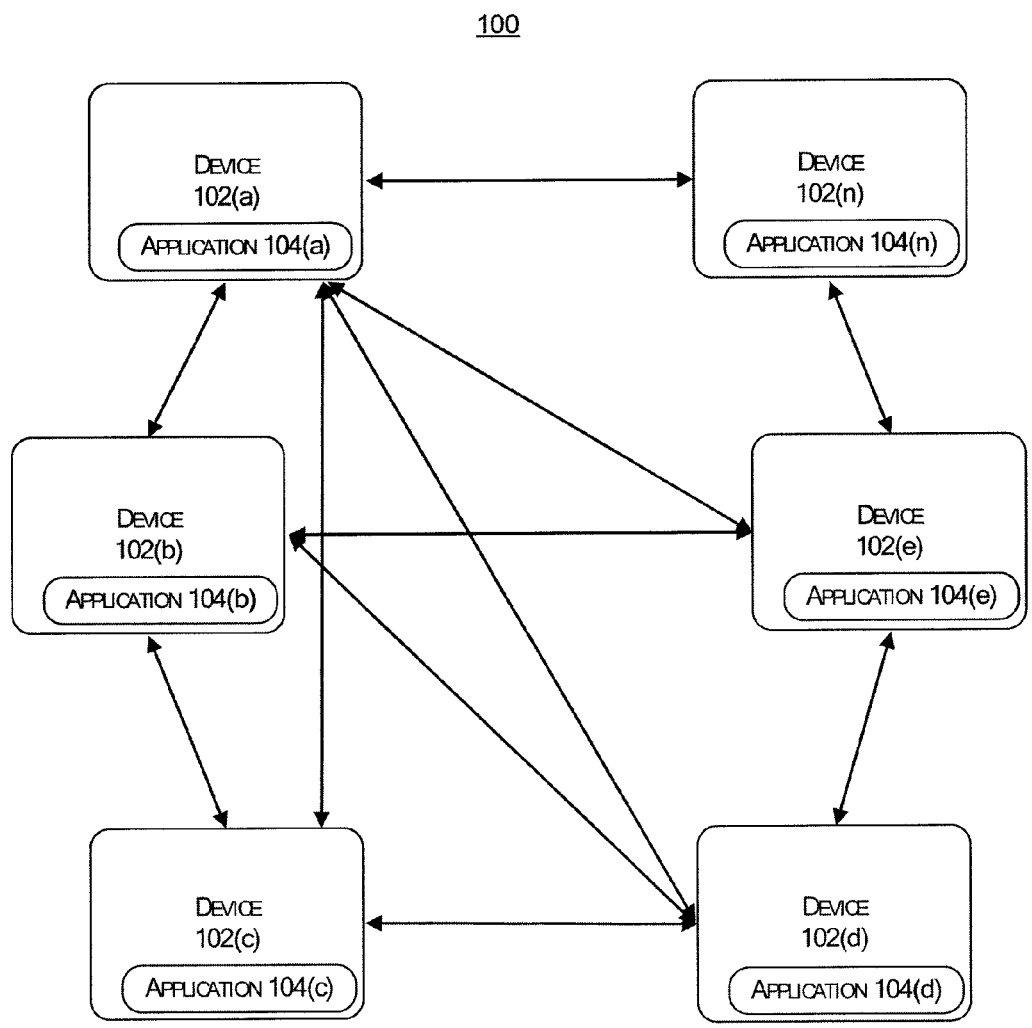
FIG. 1 shows an example of a peer-to-peer, i.e., ubiquitous, computing environment in which device discovery may be implemented, in accordance with embodiments described herein.

In the following detailed description, reference is made to the accompanying drawings, which form a part hereof. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

FIG. 1 shows an example of a ubiquitous computing environment 100 in which device discovery may be implemented, in accordance with embodiments described herein.

Ubiquitous computing environment 100 may alternatively be regarded as a peer-to-peer network 100 since the embodiments of device discovery described herein are implemented within the context of a decentralized computing environment in which the peer nodes, or devices, act as both clients and servers to the other nodes in the computing environment.

Devices 102(*a*), 102(*b*), 102(*c*), 102(*d*), 102(*e*), . . . , 102(*n*), which may be alternatively referred to as "devices 102," collectively, or "device 102," generically, are participating nodes on decentralized, peer-to-peer network 100. Devices 102 may each be regarded as a communication endpoint or terminal equipment on peer-to-peer network 100. Devices 102 may each further be regarded as an active electronic device that is capable of sending, receiving, or forwarding information over peer-to-peer network 100. Examples of such active electronic devices include, but are not limited to, mobile (or cellular) telephones, desktop computers, laptop computers, tablet/slate computers, servers, modems, hubs, bridges, or printers/copiers. In accordance with at least some of the foregoing examples of devices 102, ubiquitous computing environment 100 may alternatively be implemented as a wireless communications network.

As shown in FIG. 1, not all of devices 102 are directly communicatively connected to each other. Further, the population of peer-to-peer network 100 is dynamic; that is, not all of devices 102 remain in peer-to-peer network 100. Rather, various ones of devices 102(*a*), 102(*b*), 102(*c*), 102(*d*), 102(*e*), . . . , 102(*n*) may drop out of peer-to-peer network 100, or one or more dynamic devices may be added to peer-to-peer network 100; and the deletions and additions to peer-to-peer network 100 need not be symmetrical, proportional, or synchronous to each other.

As further shown in FIG. 1, each of devices 102(*a*), 102(*b*), 102(*c*), 102(*d*), 102(*e*), . . . , 102(*n*) on peer-to-peer network 100 has residing thereat a corresponding client application 104(a)-(n), which may be alternatively referred to as "applications 104," collectively, or "application 104," generically. Applications 104, each of which further includes a respective figure table (which may be alternatively regarded or referred to as a "distribution table"), are the means by which device discovery is implemented in accordance with the embodiments described herein.

Figure 2:
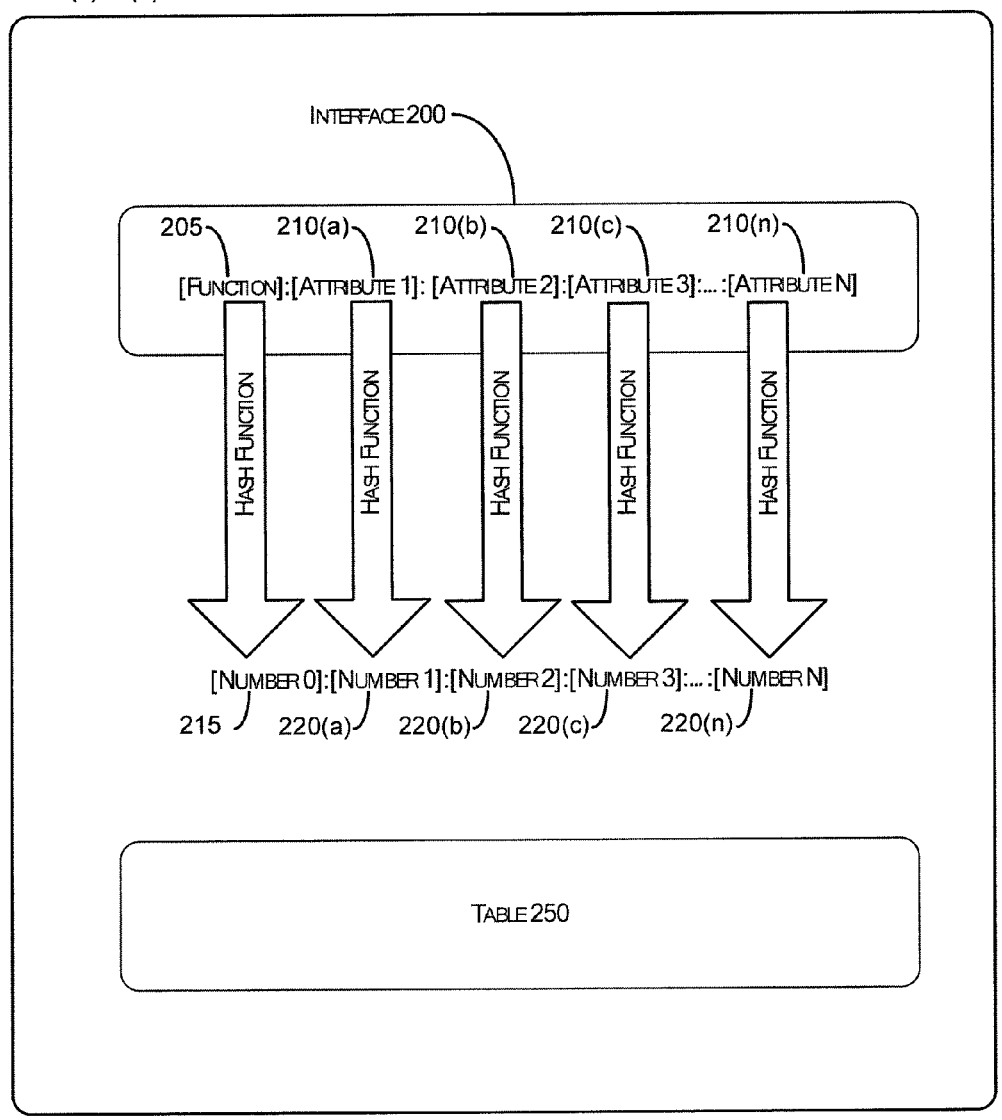
FIG. 2 shows an example embodiment of a client application, and corresponding interface, for device discovery in a ubiquitous computing environment.

FIG. 2 shows an example embodiment of client application 104 and corresponding interface 200 for device discovery in ubiquitous computing environment 100.

In accordance with the embodiments of device discovery in a ubiquitous computing environment described herein, each of devices 102(a), 102(b), 102(c), 102(d), 102(e), ..., 102(n) on peer-to-peer network 100 may have a headword to describe the function of the respective device as well as one or more descriptive words, or attributes, to further describe the functionality or some other feature of the respective device. Non-limiting examples of such other features may include a device brand, model, functionality, or even geographic location.

Further, each of devices 102(a), 102(b), 102(c), 102(d), 102(e), ..., 102(n) may have a resident instance of client application 104, on which interactive interface 200 and figure table 250 may reside. Interface 200 may include function data field 205, into which a user of the respective one of devices 102 may enter or specify a function, e.g., "printer," of a particular device that is sought on peer-to-peer network 100. Interface 200 may further include data fields 210(a), 210(b), 210(c), ..., 210(n), which may be alternatively referred to as, collectively, "attribute data fields 210," into which the user of the respective one of devices 102 may enter or specify further attributes of the device sought on peer-to-peer network 100. It should be noted that the attributes of respective ones of devices 102 may alternatively be entered into attribute data fields 210 automatically without user intervention such as when a respective device 102 is connected to peer-to-peer network 100. It is by the function data field 205 and attribute data fields 210(a)-210(n) that devices 102, and even search criteria for a particular one of devices 102, may be organized, i.e., classified, for the various embodiments of device discovery.

Thus, if the sought-after device is a printer, the functional attribute entered into function data field 205 may be entered or specified as "printer," and then pre-configured attribute data fields 210 may receive attributes that are further descriptive of the functionality and other features of the sought-after printer. Non-limiting examples of such further descriptions, with respect to "printer" entered or specified to data field 205, may include "Toshiba," "650C," "laser," "color," or "second floor." As set forth above, attribute data fields 210(a)-210(n) may be pre-configured to receive attribute data that may include, e.g., a device brand, model, functionality, or location. The pre-configuration that determines into which particular one of attribute data fields 210 the respective attribute data is to be entered or specified may be dynamic, and may differ from one embodiment to another. In addition, attribute data fields 210 may be uniquely pre-configured for specific types of devices, which may be identified by the entry to function data field 205. Therefore, using the attributes provided above as a non-limiting example, "Toshiba" may be entered or otherwise specified to attribute data field 210(a), "650C" may be entered or otherwise specified to attribute data field 210(b), "laser" may be entered or otherwise specified to attribute data field 210(c), "color" may be entered or otherwise specified to attribute data field 210(d), and "second floor" may be entered or otherwise specified to attribute data field 210(g).

Accordingly, using the above example as context, not all of attribute data fields 210 are required to be filled to correspond to an entry to function data field 205 since, for example, not all of the attributes of the sought-after device are known to the user of the current one of devices 102. In the above example, there are no entries to attribute data fields 210(e), 210(f), or those after attribute data field 210(g). When a particular attribute is not known to the user of the current one of devices 102, the pre-configured one of data fields 210 that is to receive that particular attribute may be filled with "none," "null," or some variant thereof to indicate that the corresponding attribute has no value.

Upon receiving data entries to function data field 205 and at least one of attribute data fields 210(a)-210(n), client application 104 on a respective one of devices 102 may hash the data entries, resulting in a cumulative search hash number (SHN).

More particularly, in some embodiments of client application 104, a base hash function, e.g., SHA-1, may be utilized to separately map each of function data field 205 and attribute data fields 210(a)-210(n) to a corresponding hash value of length M in hash data field 215 and hash data fields 220(a)-220(n), the latter of which may alternatively be referred to, collectively, as "hash data fields 220." Thus, the hash value of the entry to function data field 205 may be mapped to hash data field 215; and the hash values of the entries to attribute data fields 210(a)-210(n) may be mapped, respectively, to hash data fields 220(a)-220(n). For those attribute data fields 210(a)-210(n) having a value of "none," "null," or some variant thereof, the corresponding one of hash data fields 220(a)-220(n) may be populated with the value zero.

It is noted that other base hash functions may be utilized in various embodiments of device discovery, and therefore citing the example of SHA-1 is not intended to be limiting in any manner.

Hash data fields 215 and 220(a)-220(n) may be concatenated, and thus be regarded as the aforementioned cumulative search hash number (SHN). SHN is the measure, or criteria, for comparison to the contents of figure table 250 resulting in device discovery. The contents of figure table 250 includes, at least, cumulative device hash numbers (DHN) for at least a portion of devices 102 on peer-to-peer network 100.

FIG. 3 shows example table, i.e., figure table or distribution table, 250 utilized in various embodiments of device discovery in ubiquitous computing environment 100.

Table 250 may store at least DHN and IP addresses of a predetermined number of devices 102 on peer-to-peer network 100. More particularly, with peer-to-peer network 100 being populated with N number of devices or nodes, and because figure table 250 is distributed, each of devices 102 may resolve the base hash function by communicating with only a portion of the N−1 other devices 102 on peer-to-peer network 100. Thus, in steady state, each instance of figure table 250 maintains DHN and IP addresses for approximately only $O(\log N)$ other devices.

More particularly, DHN for any one of devices 102(a), 102(b), 102(c), 102(d), 102(e) 102(n) on peer-to-peer network 100 may be determined in the same manner as SHN is determined for a device that is sought-after by the user of one of devices 102. That is, the function data, i.e., headword, and available attribute data for a particular one of devices 102 may be entered in the corresponding one of pre-configured data fields 205 and 210(a)-210(n), and may then be individually hashed to corresponding hash values in fields similar to hash data fields 215 and 220(a)-220(n). The resulting hash data fields 215 and 220(a)-220(n) may then be concatenated and entered to figure table 250 in the same format as SHN.

Thus, figure table 250 may include further columns that depict at least DHN for, e.g., 0(log N), or other devices 102 on peer-to-peer network 100. More particularly, in addition to storing SHN, table 250 may store at least DHN and IP address for one or more of devices 102, and may serve as the platform for a search for a particular one of devices 102(a), 102(b), 102(c), 102(d), 102(e), . . . , 102(n) on peer-to-peer network 100.

As set forth above, substantially all of devices 102 on peer-to-peer network 100 may include an instance of client application 104 residing thereon. Each instance of client application 104 may, in turn, have an instance of interface 200 and an instance of figure table 250 included therein. However, as set forth above, not all instances of figure table 250 have DHN for every one of devices 102 on peer-to-peer network 100. For example, figure table 250 shown in the example of FIG. 3 includes SHN and DHN for devices 102(a), 102(b), 102(d), 102(e), and various ones of devices through 102(n). Clearly missing is DHN for device 102(c), though DHN of others of devices through 102(n) may also be missing from figure table 250.

Further, as set forth above, for those attribute data fields 210(a)-210(n) having a value of "none," "null," or some variant thereof, the corresponding one of hash data fields 220(a)-220(n) may be populated with the value zero. Those of hash data fields 220(a)-220(n−1) having the value zero that precede the last one of hash data fields 220 with a non-zero value may be referred to as, e.g., "empty pre-attribute data fields;" and those of hash data fields 220(b)-220(n) having the value zero that follow the last one of hash data fields 220 with a non-zero value may be referred to as, e.g., "empty post-attribute data fields."

Accordingly, when populating figure table 250, empty pre-attribute data fields may maintain the value zero while empty post-attribute data fields may be filled with the value $2^M-1$, with "M," again, referring to the length of the hash values in each of hash data fields 220. Of course, alternative embodiments may reverse the initial assignment of values to empty pre-attribute data fields and empty post-attribute data fields. But the description of the present embodiment will maintain that empty pre-attribute data fields have the value zero and empty post-attribute data fields have the value $2^M-1$. This aspect of the configuration of figure table 250 will be described below with reference to the search for a particular one of devices 102 on peer-to-peer network 100 in connection with the description of FIG. 4.

Figure 4:
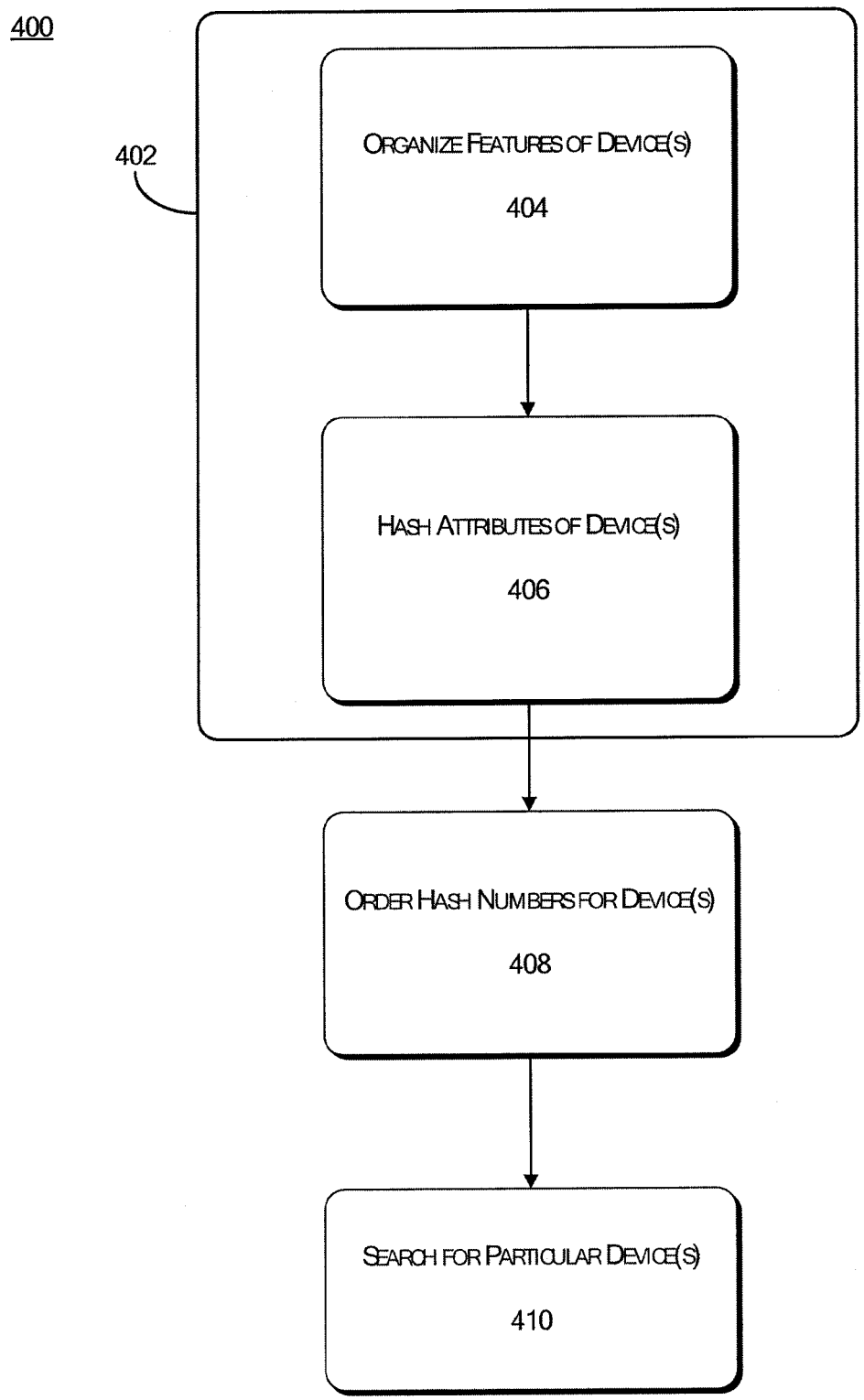
FIG. 4 shows a sample processing flow for various embodiments of device discovery in a ubiquitous computing environment.

FIG. 4 shows a sample processing flow 400 for various embodiments of device discovery in ubiquitous computing environment 100. Sample processing flow 400 is described below referencing features described with regard to the non-limiting examples of FIGS. 1-3. The order in which the operations are described in the sample processing flow is not intended to be construed as a limitation, and any number of the described blocks may be combined in any order and/or in parallel to implement each process. Moreover, the blocks in the FIG. 4 may be operations that can be implemented in hardware, software, or a combination thereof. In the context of software, the blocks represent computer-executable instructions that, when executed by one or more processors, cause one or more processors to perform the recited operations. Generally, computer-executable instructions include routines, programs, objects, components, data structures, and the like that cause the particular functions to be performed or particular abstract data types to be implemented.

Furthermore, as set forth above, the example embodiments described in this detailed description, drawings, and claims are not meant to be limiting. Other embodiments may be utilized, and other changes may be made, without departing from the spirit or scope of the subject matter presented herein. Therefore, the description of FIG. 4 will refer to "distribution table 250," in view of the earlier disclosure that each instance of application 104 may include an instance of figure table 250, which may be alternatively be regarded or referred to as "distribution table" 250.

Block 402 refers to the organizing of DHN and, in accordance with at least some embodiments of device discovery, SHN. Block 402 includes Block 404 and Block 406.

Block 404 (Organize Features of Devices(s)) more particularly refers to the organizing of features of at least a subset of devices 102 on peer-to-peer network 100, which may be implemented at the respective one of devices 102 on which the particular instance of client application 104 resides or, alternatively, at others of devices 102. In the former scenario, function data and attribute data of the predetermined number of other devices 102 may be received by client application 104 in preconfigured data fields 205 and 210(a)-210(n). In the latter scenario, function data and attribute data of respective other devices 102 may be organized by preconfigured data fields 205 and 210(a)-210(n) in the respective instance of client application 104 at respective device 102. Processing may continue from block 404 to block 406.

Block 406 (Hash Attributes of Device(s)) refers to functional data and attribute data of respective devices 102 being hashed.

Subsequent to the first scenario at block 404, block 406 may include hashing, respectively, entries to function data field 205 and entries to attribute data fields 210(a)-210(n) of the predetermined number of other devices 102. Hash data fields 215 and 220(a)-220(n), the value of each having length M, may be concatenated to form DHN for respective other devices 102.

Subsequent to the second scenario at block 404, block 406 may include hashing function data and attribute data of the predetermined number of other devices 102. Hash data fields 215 and 220(a)-220(n) may be concatenated to form DHN for respective devices 102, which may then be transmitted to the instance of client application 104 to which the respective devices 102 communicate. Processing may continue from block 406 to block 408.

Block 408 (Order Hash Numbers for Device(s)) refers to organizing and/or ordering the DHN of the respective other devices 102 into an instance of distribution table 250. The ordering of DHN for respective other devices 102 may be implemented in a hierarchical manner, by which DHN are stored in distribution table 250 sequentially, i.e., in accordance with ascending or descending hash values. Alternatively, the ordering of DHN of respective devices 102 at distribution table 250 may be implemented in accordance with various other criteria, e.g., in accordance with frequency by which the particular device is sought-after by others of devices 102, in accordance with proximity with device 102 on which the particular instance of client application 104 resides, etc. Processing may continue from block 408 to block 410.

Block 410 (Search for Particular Device(s)) refers to implementing a search for any particular one of devices 102 on peer-to-peer, i.e., ubiquitous, network 100.

SHN that is the basis, or criteria, for the search may be organized by entering the functional attribute of a sought-after device into function data field 205 and then entering attributes that further describe the sought device into the appropriate ones of pre-configured attribute data fields 210(a)-210(n). Once again, attribute data fields 210(a)-210(n) may be pre-configured to receive attribute data that may include, as non-limiting examples, a device brand, model, functionality, or location. Further, the pre-configuration that determines into which particular attribute data field 210 the respective attribute data is to be entered may be dynamic, and may differ from one embodiment to another; and attribute data fields 210 may be uniquely pre-configured for specific types of devices.

Further, when implementing the operation at block 410, not all of attribute data fields 210 will necessarily be filled for each entry to function data field 205. In the event that a particular attribute of the sought device is not known, the pre-configured one of attribute data fields 210 that is to receive that particular attribute may be filled with "none," "null," or a variant thereof to indicate that the corresponding attribute has no value.

Upon receiving data entries to function data field 205 and at least one of attribute data fields 210(a)-210(n), client application 104 on a respective one of devices 102 may implement a base hash function on the data entries, resulting in cumulative SHN. That is, each of function data field 205 and attribute data fields 210(a)-210(n) may be mapped to a corresponding hash value in hash fields 215 and 220(a)-220(n). As with DHN that populate distribution table 250, empty pre-attribute data fields may maintain the value zero, and empty post-attribute data fields may include the value $2^M-1$.

The search at block 410 may then include an attempt to match SHN to DHN that populate distribution table 250. If there is an exact match between the SHN and one of the aforementioned DHN, a notification of the result is made on the device 102 on which the particular instance of client application 104 resides.

If there is no exact match between SHN and one of the aforementioned DHN, the search continues for DHN that most closely matches SHN. Alternative embodiments of device discovery may contemplate the closest match between a non-matching DHN and SHN as being DHN that most closely matches the SHN without exceeding the value of SHN, or may contemplate the closest DHN match being the closest DHN value that exceeds the value of SHN.

Further, attempts to find the closest match between DHN that populate distribution table 250 and SHN may include filling empty pre-attribute data fields with corresponding values of the device 102 at which the particular instance of client application 104 resides. Of course, if alternative embodiments initially populated distribution table 250 with empty pre-attribute data fields having the value $2^M-1$ and empty post-attribute data fields having the value zero, the current action would include empty post-attribute data fields being filled with the corresponding values of the current device 102.

As set forth above, not all of devices 102 are directly communicatively connected to each other. Further, the population of peer-to-peer network 100 may be dynamic. Therefore, transferring the search for a match for SHN to another device broadens the search to more of devices 102 populating peer-to-peer network 102.

At least one embodiment of device discovery may result in the search operation ceasing if an exact match between SHN and any of DHN populating the table 250 is not found. Other alternative embodiments of device discovery may result in the search operation continuing by having SHN transmitted or otherwise transferred to another one of devices 102 to be compared to DHN populating distribution table 250 on the instance of client application 104 at that other one of devices 102. Process 400 may then be repeated thereat, with DHN of those of devices 102 communicating with that other device 102 populating the other distribution table 250. Client application 104 may be configured to terminate a search after a predetermined number of iterations if an exact match with a particular SHN is not found on that predetermined number of devices 102.

In accordance with the above description, device discovery in a peer-to-peer, i.e., ubiquitous, computing environment may be implemented using a base hash function.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Furthermore, the present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and even apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

Figure 5:
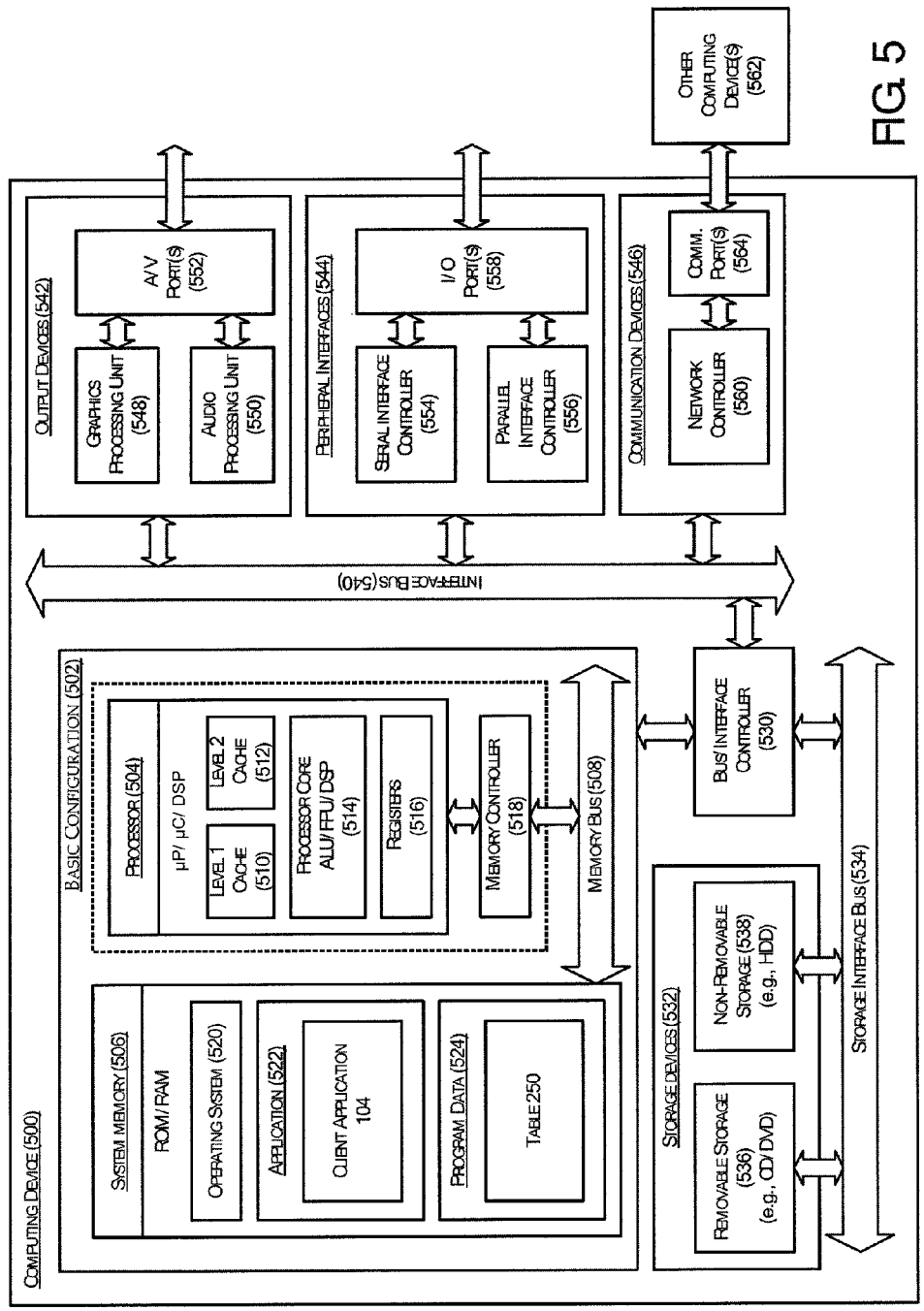
FIG. 5 shows a sample computing device in which various embodiments of device discovery in a ubiquitous computing environment may be implemented.

FIG. 5 shows sample computing device 500 in which various embodiments of device discovery in a ubiquitous computing environment may be implemented. More particularly, FIG. 5 shows an illustrative computing embodiment, in which any of the operations, processes, etc. described herein may be implemented as computer-readable instructions stored on a computer-readable medium. The computer-readable instructions may, for example, be executed by a processor of a mobile unit, a network element, and/or any other computing device.

In a very basic configuration 502, computing device 500 typically includes one or more processors 504 and a system memory 506. A memory bus 508 may be used for communicating between processor 504 and system memory 506.

Depending on the desired configuration, processor 504 may be of any type including but not limited to a microprocessor (µP), a microcontroller (µC), a digital signal processor (DSP), or any combination thereof. Processor 504 may include one more levels of caching, such as level one cache 510 and level two cache 512, processor core 514, and registers 516. An example processor core 514 may include an arithmetic logic unit (ALU), a floating point unit (FPU), a digital signal processing core (DSP Core), or any combination thereof. An example memory controller 518 may also be used with processor 504, or in some implementations memory controller 518 may be an internal part of processor 504.

Depending on the desired configuration, system memory 506 may be of any type including but not limited to volatile memory (such as RAM), non-volatile memory (such as ROM, flash memory, etc.) or any combination thereof. System memory 506 may include an operating system 520, one or more applications 522, and program data 524.

Application 522 may include Client Application 104 that is arranged to perform the functions as described herein including those described previously with respect to FIGS. 1-4. Program data 524 may include Table 250, which may alternatively be referred to as "figure table 250" or "distribution table 250," which may be useful for implementing device discovery as described herein.

Computing device 500 may have additional features or functionality, and additional interfaces to facilitate communications between basic configuration 502 and any required devices and interfaces. For example, bus/interface controller 530 may be used to facilitate communications between basic configuration 502 and one or more data storage devices 532 via storage interface bus 534. Data storage devices 532 may be removable storage devices 536, non-removable storage devices 538, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 506, removable storage devices 536, and non-removable storage devices 538 are examples of computer storage media. Computer storage media may include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 500. Any such computer storage media may be part of computing device 500.

Computing device 500 may also include interface bus 540 for facilitating communication from various interface devices, e.g., output devices 542, peripheral interfaces 544, and communication devices 546, to basic configuration 502 via bus/interface controller 530. Example output devices 542 may include graphics processing unit 548 and audio processing unit 550, which may be configured to communicate to various external devices such as a display or speakers via one or more A/V ports 552. Example peripheral interfaces 544 may include serial interface controller 554 or parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 546 may include network controller 560, which may be arranged to facilitate communications with one or more other computing devices 562 over a network communication link via one or more communication ports 564.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 500 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 400 may also be implemented as a personal computer including both laptop computer and non-laptop computer configurations.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein may be implemented, e.g., hardware, software, and/or firmware, and that the preferred vehicle may vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes for device discovery via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Lastly, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

CITATION LIST

1. Stoica, et al., Chord: *A Scalable-Peer-to-peer Lookup Service for Internet Applications*, SIGCOMM '01, Aug. 27-31, 2001, San Diego, Calif., USA.

The invention claimed is:

1. A method, comprising:
   hashing, individually, features of devices in a ubiquitous computing environment into a series of hierarchical hash numbers, the features of each of the devices include a functional name and at least one descriptive attribute of the respective devices;
   organizing, the respective hash numbers into the series of hierarchical hash numbers by:

receiving the functional name and at least one descriptive attribute of one of the devices into respective pre-configured data fields, and hashing each of the respective pre-configured data fields, including filling one of an empty one of the respective pre-configured data fields for the each of the received attributes with a predetermined value, the predetermined value is a numerical value, wherein the hierarchical hash numbers for each of the devices includes a concatenation of a base hash representation of, respectively, the functional name and the one or more descriptive attributes of the respective device;

ordering the hierarchical hash numbers corresponding to the respective devices sequentially;

receiving data entries including the functional name and at least one descriptive attribute of the device subject to a search;

hashing the data entries results in hashed search criteria; and searching for a particular one of the devices by attempting to match the hashed search criteria to the ordered hierarchical hash numbers at one of the devices in the ubiquitous computing environment.

2. The method according to claim 1, wherein the organizing includes:
concatenating the hashed data fields.

3. The method according to claim 1,
wherein the organizing includes:
classifying each of the devices individually according to the functional name and the at least one descriptive attribute,
wherein further the functional name and the at least one descriptive attribute are entered into respective pre-configured data fields, and
hashing the respective data fields; and
wherein the ordering includes:
ordering the collective hashed data fields for at least a portion of the devices hierarchically in a distributed table stored at one of the devices in the ubiquitous computing environment.

4. The method according to claim 1, wherein the ubiquitous computing environment is a decentralized peer-to-peer network.

5. The method according to claim 1, wherein the devices are hardware devices on a wireless communications network.

6. The method according to claim 1, wherein the ordering includes storing the hierarchical hash values for at least a portion of all of the devices in sequential order in a figure table at one of the devices.

7. The method according to claim 1, wherein each of the devices stores a figure table including the ordered hierarchical hash values and IP address for a predetermined number of other devices in the ubiquitous computing environment.

8. The method according to claim 1, wherein the hashed search criteria includes the concatenation of the base hash representation of the functional name and the one or more descriptive attributes of the device subject to the search.

9. The method according to claim 1, wherein the searching includes:
receiving at least a descriptive function and at least one descriptive attribute of a sought device into respective pre-configured data fields;
hashing each of the respective preconfigured data fields;
concatenating the hashed data fields; and
mapping the concatenated hashed data fields on to the hierarchical hash numbers corresponding to at least a portion of the devices.

10. A non-transitory computer-readable medium storing computer-executable instructions that, when executed, cause one or more processors to:
receive attributes of a device in a de-centralized computing environment;
hash the received attributes individually, by executing instructions to:
execute a base hash function on a respective data field for each of the received attributes, and
fill an empty one of the respective data fields for the each of the received attributes with a predetermined value, the predetermined value being a numerical value;
combine the hashed attributes for the device;
order the hashed attributes relative to those of a predetermined number of other devices;
store the ordered hash attributes for at least a portion of the remaining devices in the de-centralized computing environment;
receive hashed search criteria, by executing instructions to:
receive data entries including the functional name and at least one descriptive attribute of the device subject to a search, and
hash the data entries results in hashed search criteria; and
map the received hash search criteria onto the stored hash attributes for those of the portion of devices on the de-centralized computing environment.

11. The non-transitory computer-readable medium according to claim 10, wherein the stored computer-executable instructions are included in a software client residing on multiple devices in the de-centralized computing environment.

12. The non-transitory computer-readable medium according to claim 10, wherein the received attributes include a functional name and at least one descriptive attribute of the device.

13. The non-transitory computer-readable medium according to claim 10, wherein the computer-executable instructions that cause the one or more processors to order the hashed attributes cause the one or more processors to organize the combined hashed attributes in a distributed table along with the combined hashed attributes of at least a portion of the remaining devices in the de-centralized computing environment.

14. The non-transitory computer-readable medium according to claim 10, wherein the stored computer-executable instructions are included in a software client residing on multiple devices in the de-centralized computing environment, and
wherein further every device in the de-centralized computing environment on which the software client resides stores a distributed table in which the hashed attributes and IP addresses of the respective device and at least a portion of the remaining devices in the de-centralized computing environment are stored.

15. The non-transitory computer-readable medium according to claim 10, storing further computer-executable instructions that, when executed, cause the one or more processors to:
identify the device in the de-centralized computing environment corresponding to one of the stored ordered hash attributes whose stored hash attributes match the received hash search criteria.

16. The non-transitory computer-readable medium according to claim 10, storing computer-executable instructions that, when executed, cause the one or more processors to further:
   identify the device in the de-centralized computing environment corresponding to one of the stored ordered hash attributes whose stored hash attributes most closely corresponds to the received hash search criteria.

17. The non-transitory computer-readable medium according to claim 10, wherein the stored computer-executable instructions are included in a software client residing on multiple devices in the de-centralized computing environment, and
   wherein the computer-readable medium stores further computer-executable instructions that, when executed, cause the one or more processors to cause the received hashed search criteria to be sent to another one of the devices in the de-centralized computing environment on which the software client resides.

18. A non-transitory computer-readable medium storing computer-executable instructions that, when executed, cause one or more processors to:
   display an interface having device description data fields to receive descriptive attributes of a device subject to a search in a peer-to-peer computing environment;
   hash each descriptive attribute entered into the respective device description data fields, by executing instructions to fill an empty one of the device description data fields with a predetermined value, the predetermined value being a numerical value;
   concatenate the hashed descriptive attributes; and
   determine if the concatenated hashed descriptive attributes match any hashed strings stored to a figure table at the client,
   wherein the hashed strings are stored to the figure table by executing instructions to:
      receive attributes of one of a predetermined number of devices in the peer-to-peer computing environment;
      hash the received attributes individually, by executing instructions to:
         execute a base hash function on a respective data field for each of the received descriptive attributes, and
         fill an empty one of the respective data fields for the each of the received attributes with the predetermined value, the predetermined value being the numerical value;
      combine the hashed attributes for the device;
      order the hashed attributes relative to those of the predetermined number of other devices; and
      store the ordered hash attributes for at least a portion of the remaining devices in the peer-to-peer computing environment to the figure table at the client.

19. The non-transitory computer-readable medium according to claim 18, wherein the device description data fields are preconfigured to receive a functional name and at least one descriptive attribute of a sought device.

20. The non-transitory computer-readable medium according to claim 18, wherein the figure table at the client includes hashed strings of descriptive attributes and IP addresses of the predetermined number of devices in the peer-to-peer computing environment.

21. The non-transitory computer-readable medium according to claim 18, wherein the computer-executable instructions that cause the one or more processors to determine further cause the one or more processors to send the concatenated hashed descriptive attributes to another one of the devices in the peer-to-peer computing environment on which the software application resides.

* * * * *

UNITED STATES PATENT AND TRADEMARK OFFICE
CERTIFICATE OF CORRECTION

PATENT NO.        : 8,850,021 B2                          Page 1 of 1
APPLICATION NO.   : 13/265778
DATED             : September 30, 2014
INVENTOR(S)       : Cao et al.

It is certified that error appears in the above-identified patent and that said Letters Patent is hereby corrected as shown below:

In the Specification

In Column 1, Line 36, delete "SUMMARY OF INVENTION" and insert -- SUMMARY --, therefor.

In Column 2, Line 11, delete "DESCRIPTION OF EMBODIMENTS" and insert -- DETAILED DESCRIPTION --, therefor.

In Column 4, Line 57, delete "102(e) 102(n)" and insert -- 102(e),...,102(n) --, therefor.

In Column 9, Line 52, delete "I/O ports 458." and insert -- I/O ports 558. --, therefor.

In Column 10, Line 11, delete "device 400" and insert -- device 500 --, therefor.

In Column 10, Line 55, delete "and or" and insert -- and/or --, therefor.

Signed and Sealed this
Twenty-fourth Day of March, 2015

Michelle K. Lee
*Director of the United States Patent and Trademark Office*